United States Patent [19]

Platt et al.

[11] E Patent Number: Re. 33,501

[45] Reissued Date of Patent: Dec. 25, 1990

[54] FIRE-RATED BEAM WITH EXPANSION RELIEF SECTION

[75] Inventors: William J. Platt, Collingdale; Daniel C. Ziegler, Millersville; Eugene E. Brady, Hatfield, all of Pa.

[73] Assignee: National Rolling Mills, Inc., Malvern, Pa.

[21] Appl. No.: 233,633

[22] Filed: Aug. 18, 1988

Related U.S. Patent Documents

Reissue of:

[64] Patent No.: 4,606,166
Issued: Aug. 19, 1986
Appl. No.: 733,628
Filed: May 13, 1985

[51] Int. Cl.[5] ..... E04B 1/68; E04B 5/50; E04C 2/42

[52] U.S. Cl. ..... 52/664; 52/232; 52/573; 52/DIG. 5

[58] Field of Search ..... 52/664, 573, DIG. 5, 52/484, 665–669, 735, 232, 726

[56] References Cited

U.S. PATENT DOCUMENTS

| | | | |
|---|---|---|---|
| 3,846,031 | 11/1974 | Adams | 52/573 |
| 3,965,631 | 6/1976 | Sauer | 52/232 |
| 4,016,701 | 4/1977 | Beynon | 52/573 |
| 4,106,878 | 8/1978 | Jones | 52/664 |
| 4,598,514 | 7/1986 | Shirey | 52/664 |
| 4,713,919 | 12/1987 | Platt | 52/232 |

FOREIGN PATENT DOCUMENTS

| | | | |
|---|---|---|---|
| 848115 | 8/1970 | Canada | 52/DIG. 5 |
| 996502 | 8/1970 | Canada | 52/DIG. 5 |
| 1038585 | 9/1978 | Canada | 52/DIG. 5 |

*Primary Examiner*—John E. Murtagh
*Attorney, Agent, or Firm*—Eugene Chovanes

[57] ABSTRACT

A beam for a fire-rated suspended ceiling structure wherein the beam has an inverted-T construction and includes a central web having a bulb at the top and a pair of oppositely disposed flanges at the bottom for supporting ceiling tiles, and an improved expansion relief section of the beam comprising a section of the web having a pair of spaced vertical cuts in the web and an horizontal cut extending between the upper ends of the vertical cuts to form a tab extending upwardly from the pair of flanges, the tab having an inverted triangular cut-out portion the apex thereof adjacent the pair of flanges and dividing the tab into two portions, a pair of protuberances formed in the upper edge of the tab portion contacting the upper portion of the web, and a section of the bulb having a crushed portion opposite the apex of the triangular cut-out portion, the crushed portion of the bulb having a substantially Z-shaped configuration whereby when the beam is subjected to expansion forces accompanying fire conditions the Z-shaped configuration of the crushed portion of the bulb is compressed along the axis of the beam and the vertical cuts on the tab portion cooperate with the opposed section of the web to cause the flanges of the beam to bend downwardly adjacent the apex of the triangular cut-out portion to relieve the expansion forces without substantial twisting of the beam thereby avoiding displacement of the support for the ceiling tiles.

7 Claims, 2 Drawing Sheets

FIRE-RATED BEAM WITH EXPANSION RELIEF SECTION

Matter enclosed in heavy brackets [ ] appears in the original patent but forms no part of this reissue specification; matter printed in italics indicates the additions made by reissue.

BACKGROUND OF THE INVENTION

This invention relates generally to support beams for a fire-rated suspended ceiling system and more particularly to an improved expansion relief section for such beams which is deformable under the application of expansion forces in the beam accompanying fire conditions to accommodate such expansion.

In general a beam for a fire-rated suspended ceiling structure has an inverted-T construction and includes a central web having a bulb at the top and a pair of oppositely disposed flanges at the bottom for supporting ceiling tiles or the like. Expansion joints or sections have been fabricated into the beams to accommodate for expansion of the beam when it is subjected to high temperature accompanying fire conditions. While the prior art has disclosed various types of fire-rated beam expansion systems, they have left something to be desired. The prior art ceiling suspension systems offering such expansion relief create a weakness in the support beams and to overcome that weakness isolate the required expansion to a minimum number of expansion relief points. The present invention overcomes the weakness in such structures by removing less material. By keeping more of the structure intact, more expansion relief points can be provided thereby providing expansion where it is needed. Another common failure in prior systems is the risk of the tile supporting flange buckling upward thereby limiting the beam expansion to less than is expected. The present invention eliminates the risk by providing means of positive force downward on the tile supporting flange to insure full expansion potential.

In the prior art beams, while various arrangements have been made in both the web and the bulb of the beam such arrangements have tended to weaken the beam. It is extremely important that ceiling the supporting grid structures maintain their integrity under abnormally elevated temperatures, such as accompanying the fire. Under these high temperature conditions, metallic grid members, which generally are fixed at their end points, expand and buckle whereby the supported ceiling tiles are displaced and sometimes tilted to such an extent that they drop through the openings formed by the intersecting grid members. As a result the effectiveness of this suspended ceilings as a fire barrier is destroyed and the overhead ceiling and related support structure is exposed to fire whereby such fire can spread more easily and rapidly through the entire structure.

The disadvantages of the prior art are overcome by the present invention which not only provides a strong supporting beam structure under normal conditions but when the beam is subjected to expansion forces accompanying fire conditions the expansion forces are relieved on the beam without substantial twisting of the beam thereby avoiding displacement of the support for the ceiling tiles.

SUMMARY OF THE INVENTION

In accordance with the present invention there is provided a beam for a fire-rated suspended ceiling structure wherein the beam has an inverted-T construction and includes a central web having a bulb at the top and a pair of oppositely disposed flanges at the bottom for supporting ceiling tiles and an improved expansion relief section. The improved expansion relief section of the beam comprises a section of the web having a pair of spaced vertical cuts in the web and a horizontal cut extending between the upper ends of the vertical cuts to form a tab extending upwardly from the pair of flanges. The tab has an inverted triangular cut-out portion with the apex thereof adjacent the pair of flanges and dividing the tab into two portions. A pair of protuberances is formed in the upper edge of the tab portions. A section of the bulb has a crushed portion opposite the apex of the triangular cut-out portion, the crushed portion of the bulb having a substantially Z-shaped configuration whereby when the beam is subjected to expansion forces accompanying fire conditions the Z-shaped configuration of the crushed portion of the bulb is compressed along the axis of the beam and the flanges of the beam bend downwardly adjacent the apex of the triangular cut-out portion to relieve the expansion forces without substantial twisting of the beam thereby avoiding displacement of the support for the ceiling tiles.

The crushed portion of the bulb has a tuck at the top thereof extending along the substantially Z-shaped configuration so that the crushed portion does not extend above the top of the uncrushed portion of the bulb. This construction in addition to providing an area for expansion of the beam along the bulb, strengthens the bulb portion of the beam and also provides for convenience in packaging the beams for shipping.

Other features and advantages of the invention and a more complete understanding of the invention will become apparent from the following detailed description, taken in conjunction with the accompanying drawings which form a part of the specification.

DETAILED DESCRIPTION

Figure 1:
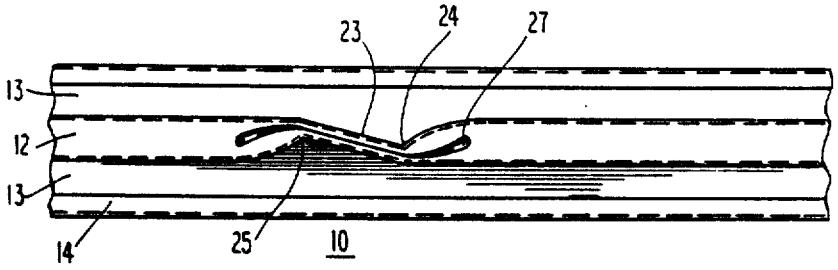
FIG. 1 is a fragmentary, top plan view of a fire-rated beam incorporating the present invention.
Figure 2:
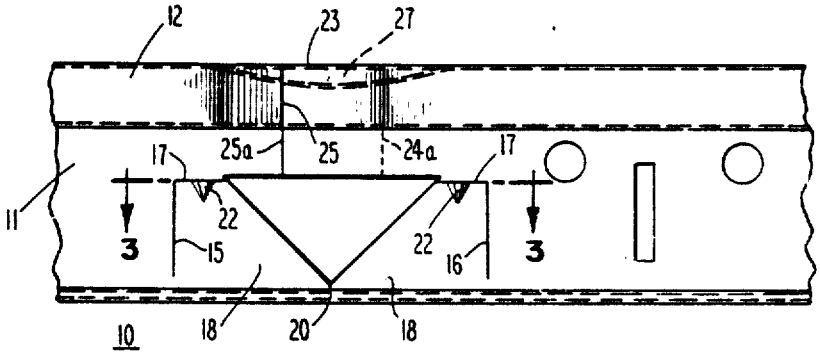
FIG. 2 is a fragmentary, side elevation view of a fire-rated beam incorporating the present invention.
Figure 3:
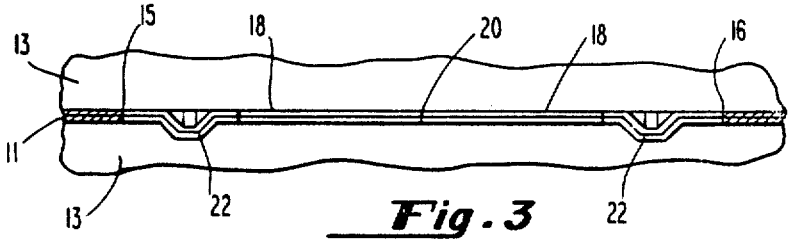
FIG. 3 is a cross-sectional view of enlarged scale taken along lines 3—3 in FIG. 2.
Figure 4:
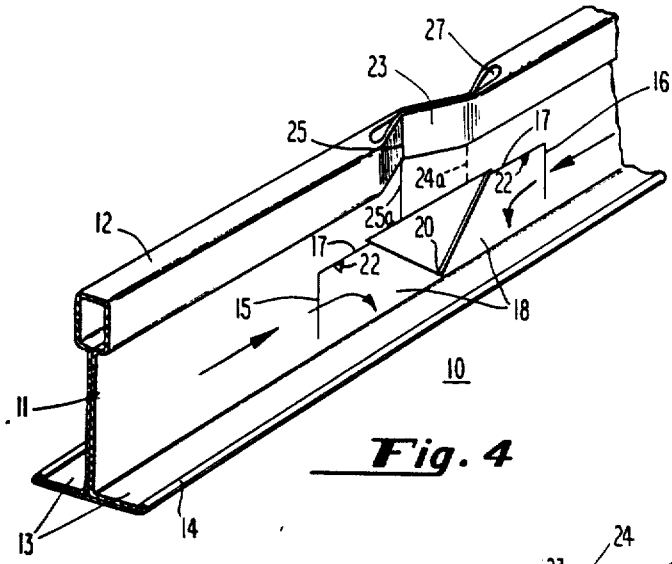
FIG. 4 is a fragmentary, perspective view of the fire-rated beam shown in FIGS. 1 and 2.

Referring to the drawings and particularly to FIGS. 1,2 and 4 there is shown a fire-rated beam 10 having an inverted-T construction which includes a central web 11 having a bulb 12 at the top and a pair of oppositely disposed flanges 13, 13 at the bottom for supporting ceiling tiles or the like. The fire-rated beam 10 is preferably of the double web type in which a strip of sheet metal is bent intermediate its longitudinal edges to form the bulb 12 with the portion of the strip at opposite sides of the bulb being brought into parallel relation to form the web 11 and the edge portions of the strip being bent at right angles thereto to form the oppositely disposed flanges 13, 13. A separate decorative cap 14 covers the flanges and is formed by a strip of material having its longitudinal edges folded around the adjacent edges of the associated flanges 13, 13. The beam as thus far described is generally of standard construction as utilized in the trade.

The expansion section of the fire-rated beam 10 is substantially defined by two spaced vertical cuts 15, 16 in web 11. The vertical cuts 15, 16 extend upwardly in the web 11 from a location adjacent the flanges 13, 13 and a horizontal cut 17 extends between the upper ends of the vertical cuts 15, 16 to form a tab 18 extending upwardly from the pair of flanges 13, 13. The tab 18 has an inverted triangular cut-out portion with the base thereof extending along the horizontal cut 17 and the apex 20 thereof adjacent the pair of flanges 13, 13 dividing the tab 18 into two portions. A pair of protuberances 22, 22 are formed in the upper edge of the tab 18 and are disposed on opposite sides of the triangular cut-out portion. The protuberances 22, 22 are in abutting relation to the opposed section of the web 11, the purpose of which will be hereinafter described.

As best seen in FIGS. 1, 2 and 4, in the expansion relief section of the beam a section of the bulb 12 has a crushed portion 23, the center of which is opposite the apex 20 of the triangular cut-out portion. The crushed portion 23 has spaced vertical crush lines or indentations 24 and 25 at the opposite sides and ends thereof which provide lines for bending the bulb 12 and produce a substantially Z-shaped configuration as best seen in FIGS. 1 and 4. Web 11 is provided with crush lines or indentations 24a and 25a which provide lines for bending the web 11 when subjected to the expansion forces caused by the heat of a fire.

The crushed portion of the bulb 12 is provided with a tuck 27 in the top of the bulb. The purpose of the tuck 27 is to insure that the crushed portion 23 of the bulb does not extend above the normal upper surface of the bulb 12 and also to provide additional strength in the bulb 12 at the crused area.

Figure 5:
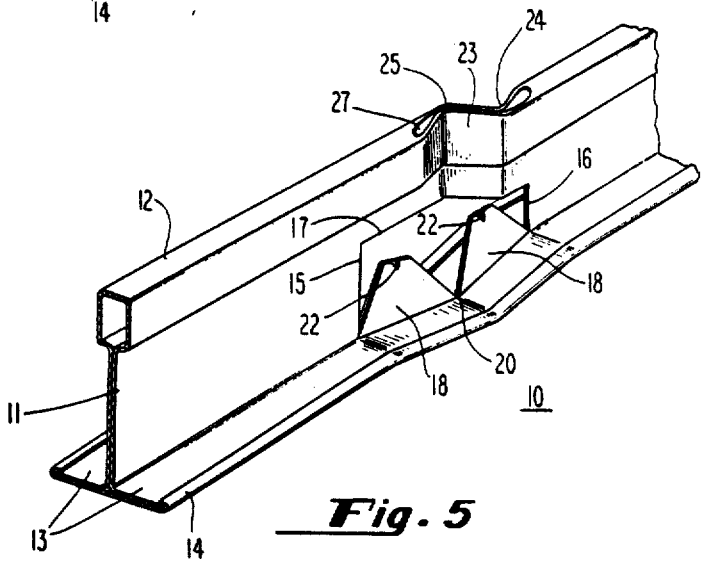
FIG. 5 is a fragmentary, perspective view of the fire-rated beam shown in FIG. 4 after it has been subjected to expansion forces such as accompanying fire conditions.

As pointed out above when the fire-rated beams are mounted in position to support a suspended ceiling the ends of the beams are in fixed position. When a beam 10 embodying the improved expansion relief section of the present invention is subjected to expansion forces accompanying fire conditions the Z-shaped configuration of the crushed portion 23 of the bulb 12 is compressed along the axis of the beam 10 creating bending at lines 24 and 25 of the bulb, and lines 24a and 25a of the web, thereby moving from the normal position shown in FIG. 4 to the position after expansion of the beam 10 as shown in FIG. 5. Heat first causes expansion in flanges 13, 13 then in web 11, and is relieved by exerting force on cut lines 15 and 16 and therefore on tabs 18 which rotate, forcing point 20 to move downwardly, thereby avoiding displacement of the support for the ceiling tiles. As may be seen in FIG. 5, after the expansion forces have been applied to the beam 10 the Z-shaped configuration of the crushed portion 23 has been compressed from the normal position shown in FIG. 4 and the flanges 13, 13 have been bent downwardly adjacent the apex 20 of the triangular cut-out portion thereby causing the two portions of the tab 18 to pivot downwardly and away from the vertical sides of the cuts 15 and 16. While the flanges 13, 13 in FIG. 5 have bent downwardly at the point 20, the flanges have not twisted or been off-set with respect to the normal longitudinal axis of the beam 10. Thus the flanges 13, 13 remain in position providing the necessary support for the ceiling tiles.

The probuerances 22 make the web 11 stronger during normal operation because they provide a path for lines of force to flow from the top of bulb 12 through web 11 to the flange 13, 13 when beam 10 is in normal operation, not in the presence of a fire and not being subjected to the expansive forces of a fire. Without protuberances 22 the portion of web 11 above horizontal cut 17 may not contact the portion of web 11 below horizontal cut 17, and this would weaken the web. Protuberances 22 strengthen the web 11 during normal use by providing contact between the portions of the web 11 above and below horizontal cut 17.

As pointed out above, the crushed portion 23 of the bulb 12 is provided with a tuck 27 which insures that the crushed portion does not extend above the normal surface of the bulb 12. In addition to providing additional strength for the bulb at the crushed portion, this construction permits the beams to be conveniently packaged for shipping. For example, a first beam is placed face down and a second beam inverted with the bulb touching the upper portion of the flange of the lower beam. If the bulb were protruding, it would press on the lower flange and cause a bulge in the face of the flange thereby damaging it. Thus it will be seen that the crushed portion of the bulb has a three fold purpose: firstly, to provide an area for expansion of the beam along the bulb; secondly, to provide increased strength in the crushed portion of the bulb; and thirdly, for convenience in packaging the beams for shipment.

We claim:

1. In a beam for a fire-rated suspended ceiling structure wherein the beam has an inverted-T construction and includes a central web having a bulb at the top and a pair of oppositely disposed flanges at the bottom for supporting ceiling tiles, and improved expansion relief section of said beam comprising a section of said web having a pair of spaced vertical cuts in said web and a horizontal cut extending between said vertical cuts to form a tab extending upwardly from said pair of flanges, said tab having an edge contacting an edge of said cuts for blocking upward movement of the tab to prevent the flanges of the beam from bending upwardly when the beam is subjected to expansion forces, said tab having an inverted triangular cut-out portion with the apex thereof adjacent said pair of flanges and dividng said tab into two portions, and a section of said bulb having a crushed portion opposite said apex of said triangular cut-out portion, said crushed portion of said bulb having a configuration such that when said beam is subjected to expansion forces accompanying fire conditions the configuration of said crushed portion of said bulb is bent at two points along the axis of said beam and said flanges of said beam are bent downwardly adjacent said apex of said triangular cut-out portion to relieve the expansion forces without substantial twisting of said beam thereby avoiding displacement of the support for the ceiling tiles.

2. In a beam having a fire-rated suspended ceiling structure according to claim 1 wherein said crushed portion of said bulb has a tuck in the top thereof so that said crushed portion does not extend above the surface of the adjacent uncrushed portions of said bulb.

3. In a beam having a fire-rated suspended ceiling structure wherein the beam has an inverted-T construction and includes a central web having a bulb at the top and a pair of oppositely disposed flanges at the bottom for supporting ceiling tiles, an improved expansion relief section of said beam comprising a section of said web having a pair of spaced vertical cuts in said web and a horizontal cut extending between said vertical cuts to form a tab extending upwardly from said pair of flanges, said tab having an inverted triangular cut-out portion with the apex thereof adjacent said pair of flanges and dividing said tab into two portions, and a section of said bulb having a crushed portion opposite said apex of said triangular cut-out portion, said crushed portion of said bulb having a configuration such that when said beam is subjected to expansion forces accompanying fire conditions the configuration of said crushed portion of said bulb is bent at two points along the axis of said beam and said flanges of said beam are bent downwardly adjacent said apex of said triangular cut-out portion to relieve the expansion forces without substantial twisting of said beam thereby avoiding displacement of the support for the ceiling tiles, and further including a pair of protuberances formed in the upper edges of said tab portions, said protuberances contacting the portion of the web above the horizontal cut to provide a path for lines of force to flow from the top of the bulb through the web to the flanges when the beam is in normal operation, not being subjected to the expansive forces of a fire.

4. In a beam for a fire-rated suspended ceiling structure wherein the beam has an inverted-T construction and includes a central web having a bulb at the top and a pair of oppositely disposed flanges at the bottom for supporting ceiling tiles, an improved expansion relief section of said beam comprising a section of said web having a pair of spaced vertical cuts in said web and a horizontal cut joining said vertical cuts to form a tab portion extending upwardly from said pair of flanges, said tab portion having an inverted triangular cut-out portion with the base thereof extending along said horizontal cut and the apex thereof adjacent said pair of flanges, a pair of protuberances formed in the upper edge of said tab and disposed on opposite sides of said triangular cut-out portion, said protuberances contacting the portion of the web above the horizontal cut to provide a path for lines of force to flow from the top of the bulb through the web to the flanges when the beam is in normal operation, and a section of said bulb having a crushed portion opposite said apex of said triangular cut-out portion, said crushed portion of said bulb having a substantially Z-shaped configuration, said crushed portion of said bulb having a tuck in the top thereof so that said crushed portion does not extend above the surface of the adjacent uncrushed portions of said bulb, whereby when said beam is subjected to expansion froces accompanying fire conditions the Z-shaped configuration of said crushed portion of said bulb is compressed along the axis of said beam and said vertical cuts on said tab cooperate with the opposed section of said web to cause said flanges of said beam to bend downwardly, and to prevent said flanges from bending upwardly, adjacent said apex of said triangular cut-out portion to relieve the expansion forces without substantial twisting of said beam thereby avoiding displacement of the support for the ceiling tiles.

*5. In a metal beam for a fire-rated suspended ceiling structure having*

*(1) an inverted-T construction with a web, a longitudinally extending hollow bulb at the top of the web, said bulb having a bulb top at the top of the beam and sides depending from the bulb top, and a pair of oppositely disposed flanges at the bottom of the web for supporting ceiling tiles;*

*(2) expansion relief means for permitting the beam to expand longitudinally during a fire without substantial twisting of said beam, thereby avoiding displacement of the support for the ceiling tiles;*

*(3) said expansion relief means including a section of said bulb having a crushed portion having a configuration such that when said beam is subjected to longitudinal expansion forces accompanying fire conditions, the configuration of said crushed portion of said bulb is bent at points along the axis of the said beam,* the improvement comprising

*a tuck in the top of the crushed portion of the bulb wherein*

*(1) said crushed portion does not extend above the surface of the adjacent uncrushed portions of said bulb, and*

*(2) the tuck is formed of a fold of metal whereby*

*(a) the fold contributes to the strength of the crushed portion of the bulb, and*

*(b) the crushed portion does not interfere with the packaging of a plurality of said beams.*

*6. A beam of claim 5 wherein the tuck in the bulb is formed in the shape of an M with the sides of the bulb forming the vertical lines of the M.*

*7. A beam of claim 5 wherein the beam is of the double web type in which a strip of sheet metal is bent intermediate its longitudinal edges to form the bulb, with the portion of the strip at opposite sides of the bulb being brought into parallel relationship to form the web and the edge portions of the strip being bent at right angles to the web to form the oppositely disposed flanges.*

* * * * *